United States Patent [19]

Emmerich

[11] 4,453,854
[45] * Jun. 12, 1984

[54] UNITIZED DRILL STEEL AND METHOD OF MANUFACTURING

[75] Inventor: Kenneth C. Emmerich, Lexington, Ky.

[73] Assignee: Fansteel Inc., North Chicago, Ill.

[*] Notice: The portion of the term of this patent subsequent to Nov. 10, 1998 has been disclaimed.

[21] Appl. No.: 468,085

[22] Filed: Feb. 22, 1983

[51] Int. Cl.³ .................... B21D 39/00; B23P 11/00
[52] U.S. Cl. ................................. 29/520; 403/279; 403/282
[58] Field of Search ............... 403/274, 279, 282, 285, 403/292; 29/520; 285/382.2, 382

[56] References Cited

U.S. PATENT DOCUMENTS

| 1,169,642 | 1/1916 | Heeter et al. | 403/274 X |
| 2,795,039 | 6/1957 | Hutchins | 285/382.2 X |
| 4,214,358 | 7/1980 | Clerc | 29/520 |
| 4,299,510 | 11/1981 | Emmerich et al. | 285/382 X |

*Primary Examiner*—Wayne L. Shedd
*Attorney, Agent, or Firm*—Barnes, Kisselle, Raisch, Choate, Whittemore & Hulbert

[57] ABSTRACT

A drill steel and method of making a drill steel with an insert which provides a male insertion segment to form a joint with the female end of a drill steel. The insert is formed with a reduced end having an annular lip and can be utilized in a die forming process which forms the end of a drill steel around the insert in a one-step forming operation while at the same time enlarging the drill steel end to form a shoulder abutment.

5 Claims, 8 Drawing Figures

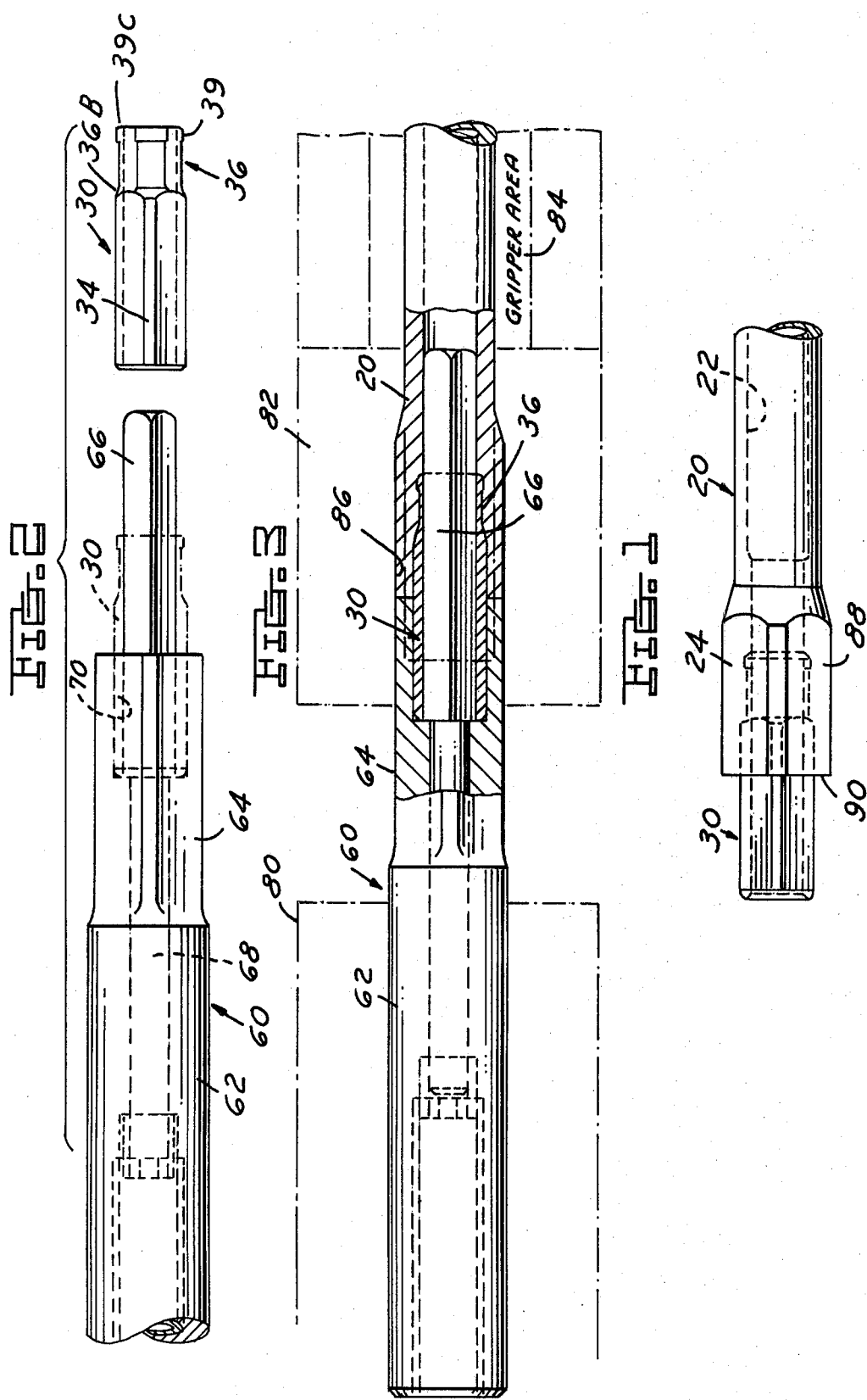

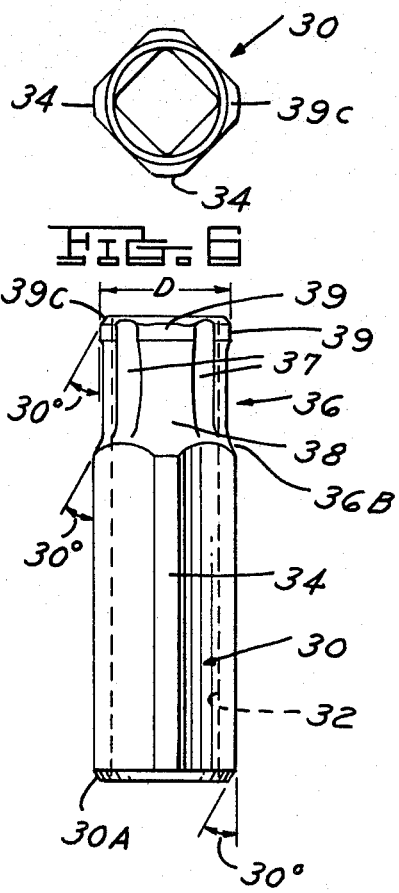
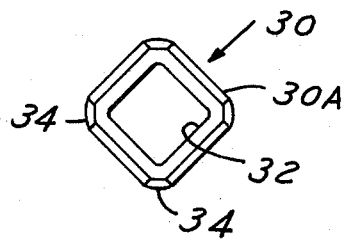
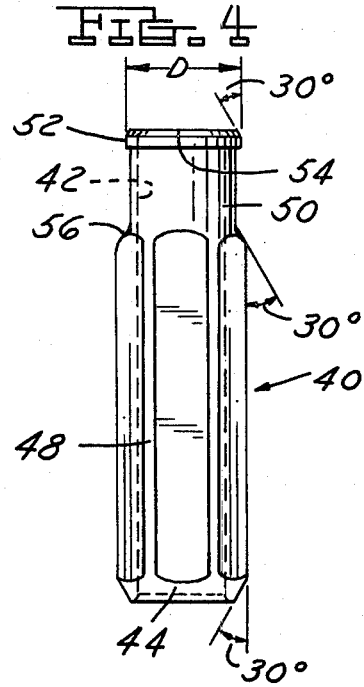
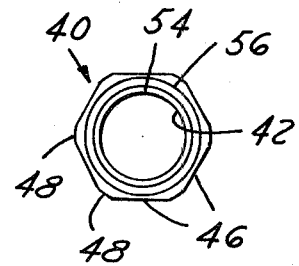

UNITIZED DRILL STEEL AND METHOD OF MANUFACTURING

FIELD OF INVENTION

Mining and rock and roof drilling in which a rotating power chuck drives a drill bit through hollow shafts called drill steels, these shafts being the starter tubes, the extension tubes used to telescopically engage drilling chucks, and power chucks. Coolant under pressure or air under suction is utilized in the hollow steels to flush away or carry away the drilling dust and fines.

BACKGROUND OF INVENTION

"Drill steels" is the term applied to hollow tubes which are used to transmit rotating power from a power source to a drill bit. The steels telescope together to provide a drill train as long as desired for a particular application. The telescopic connection is usually achieved by an ensmalled portion or male end at one end of a steel which fits into a recess at the other end of a corresponding drill steel. The so-called male end or insertion end has been applied to the drill steel by placing and joining an insert part way into the drill steel tube. The insert is joined to the exterior of the drill steel by plug welds 180° apart made in holes or slots premachined in the drill steel. Thus, a portion is extending from the tube and insertable into an adjoining tube.

In U.S. Pat. No. 4,299,510, issued Nov. 10, 1981, there is disclosed a drill steel which is formed in a two-step process which eliminates the need for any welding and insures a tighter connection for the male end. In addition, the elimination of welds avoids the creation of as-cast and heat-affected zones in the microstructure of the weldments, and also reduces the possibilities of detrimental residual stresses and notch-type defects often associated with weldments.

The present invention is directed to an improved drill steel insert in the form of an upset forging formed in a one-hit hot forming process. By changing the lead end of the insert from the blunt heavy section walls, as shown in the referenced patent, to a thinner necked-down shape, a single strike in the forming process is all that is required to establish the insert in the drill steel and at the same time to enlarge the drill steel itself.

Thus, an object of the invention is the provision of a drill steel with a thinner necked-down portion which is effective in its function to receive and retain a lead insert and yet can be made in a less expensive manner. It is a further object to provide a one-step method in which a permanent insert performs forming and assembling functions in the process of manufacture.

Other objects and features of the invention will be apparent in the following description and claims in which the invention is described and details provided to enable persons skilled in the art to utilize the invention, all in connection with the best mode presently contemplated for the practice of the invention.

BRIEF DESCRIPTION OF THE DRAWINGS

DRAWINGS accompany the disclosure and the various views thereof may be briefly described as:

FIG. 1, a view of a drill steel with insert in place.

FIG. 2, a view of the forming punch and the insert prior to (solid lines) and after assembly (dotted lines).

FIG. 3, a view of the forming punch and die block in the striking position.

FIG. 4, an elevation view of an insert.

FIG. 5, an end view of the insert of FIG. 4.

FIG. 6, an elevation view of an insert of larger diameter.

FIG. 7, a view of the bottom end of the insert of FIG. 6.

FIG. 8, a view of the top end of the insert of FIG. 6.

DETAILED DESCRIPTION OF THE INVENTION AND THE MANNER AND PROCESS OF USING IT

With reference to the drawings, in FIG. 1, a completed male end of a drill steel is illustrated. A drill steel 20 has an central air passage 22 with an enlarged end 24 in which is positioned an insert 30. The insert is surrounded at one end by the enlarged end 24 of the drill steel which has been formed around the insert to lock it in place so that the outer end of the insert 30 will have a driving relationship with another drill steel having an acircular female recess to complement and receive the extended end of the insert 30. For example, the drill steel 20 will have, at its other end (not shown), a recess to receive an extending insert 30.

In FIGS. 4 to 8, details of the insert are illustrated. The embodiment in FIG. 4 shows an insert 40 with a generally hexagonal shape having a central recess 42. The lower end of the insert as viewed in the drawing is chamfered at a 30° angle externally at 44 and the hexagonal sides 46 create six corner ribs 48 spaced circumferentially around the outer walls. The top end of the insert 40 is reduced in diameter by a lathe or screw machine operation to decrease the wall thickness at 50 but an annular lip 52 is left at the end of the insert which will be retained in a drill steel. The reduced end 50 is provided with a 30° chamfer at 54 (FIG. 4) and the reduced portion 50 joins the hexagonal body at a 30° chamfer 56. The outer diameter of the annular lip 52 is approximately the same dimension as the inner diameter (ID) of a drill steel into which the reduced end will be introduced, but the smallest diameter of the chamfer 54 is less than the ID of the drill steel into which it is to be introduced.

In FIG. 6, a second insert is illustrated, this being used for larger diameter units. Since this is the same insert as illustrated in FIGS. 1, 2 and 3, the reference character 30 is applied, the insert having a square central recess 32 and a generally four-sided cross-section with narrow flats 34 between the wider sides. The bottom end view of insert 30 is illustrated in FIG. 7.

The upper end 36 of insert 30, as viewed in FIG. 6, is reduced in diameter and wall thickness by an appropriate matching or forming operation but still has an acircular cross-section with alternate flats 37 and rounded portions 38. Also, an annular lip 39 is provided at the outer end of the flat sections 37 in the ensmalled area. Beveled portions at a 30° angle are shown at 30A, 36B and 39C as in FIG. 6. In this embodiment, as in that of FIG. 4, the outer diameter D of the lip portion 39 is about the diameter of the inside of a drill steel but the smallest diameter of the bevel 39C is less than the ID of the drill steel.

Reverting now to FIGS. 1 to 3, in FIG. 2, a header punch driver 60 has a body 62 with an ensmalled end 64. A square ended pilot unit 66 has a mounting shank 68 within the driver 60. The pilot end 64 projects from the driver 60 but an annular recess 70 is provided around the shank 68 to receive the large end of the insert 30 to about one-half of its length. The insert 30 is shown in full lines in FIG. 2 prior to the time that it is placed on to the pilot unit 66 and into the recess 70. The dotted lins show the assembled position.

FIG. 3 illustrates the header punch driver 60 and pilot 66 mounted in a header block 80 which will drive the punch. A die block 82 receives the drill steel 20 and is provided with a gripper section 84. It will be appreciated that the drill steel element 20 is a straight steel tube at this initial stage of the operation. In the one-step forming, the pre-heated steel tubing 20 is driven endwise by the fast motion of the header block and the die block as they are moved toward each other. This motion, first of all, causes the bevel end 39C of insert 30 to enter the hot drill steel in a manner to open up the drill steel slightly, the extent depending on the relative diameters, and at the same time the square pilot 66 prevents the collapse of the insert 30. Thus, the insert at this stage is serving as a die. A further motion brings the second bevel section 36B into the drill steel, causing further enlargement of the leading end of the drill steel. Simultaneously, the outer die block 82 is confining the drill steel in the pocket 86. The result is a forming of the drill steel 20 with an enlarged end while driving the metal snugly around the insert 30 and into the narrowed portion 36. The left-hand end of insert 30, as viewed in FIG. 3, which is within the header punch driver, is confined to remain in its original form. The drill steel is tightly formed around the acircular driver insert to provide a strong torque resistant connection and also is interlocked into the neck of the insert to prevent axial withdrawal. The drill steel has a shoulder 90 which will abut the end of another drill steel having a female recess to receive the projecting end of insert 30.

What is claimed is:

1. A method of fabricating a drill steel for use in a string of telescoped drill steels for rock and roof drilling which comprises:
   (a) selecting a straight tubular drill steel,
   (b) selecting a male insert with a first portion to be projected into said drill steel and with a second portion to extend outwardly of the drill steel concentric with the drill steel, said first portion having an end with a reduced outer diameter in comparison with said second portion,
   (c) heating said drill steel and driving said first portion of said male insert into the end of said heated drill steel thereby enlarging the end of said drill steel, and
   (d) confining the said drill steel externally thus causing the metal of said drill steel to form tightly around said reduced end of said insert.

2. A method as defined in claim 1 which includes forming a lip on the outer end of said first portion of larger diameter than said first portion thereby effecting an axial lock of said parts.

3. A method as defined in claim 1 which includes forming a chamfer on the entry end of said first portion and the juncture of said first portion with said insert body thus rendering the insert a temporary forming die.

4. A method as defined in claim 1 in which a pilot insert is projected into said drill steel along with said male insert to maintain the inner diameter of said male insert and said drill steel during the insertion and forming step.

5. A method as defined in claim 1 in which said male insert has an acircular external cross-section about which said enlarged end of said drill steel is formed thereby interlocking said drill steel and insert circumferentially.

* * * * *